US012297747B1

(12) United States Patent
McCaffrey et al.

(10) Patent No.: US 12,297,747 B1
(45) Date of Patent: May 13, 2025

(54) INLET PROTECTOR FOR VANE COUPLING HOLE

(71) Applicant: RTX Corporation, Farmington, CT (US)

(72) Inventors: Michael G. McCaffrey, Windsor, CT (US); Paul M. Lutjen, Kennebunkport, ME (US); Mark F. Zelesky, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/406,289

(22) Filed: Jan. 8, 2024

(51) Int. Cl.

| | |
|---|---|
| ***F01D 5/18*** | (2006.01) |
| ***F01D 9/06*** | (2006.01) |
| ***F01D 11/00*** | (2006.01) |
| ***F01D 25/12*** | (2006.01) |

(52) U.S. Cl.
CPC ............. *F01D 5/187* (2013.01); *F01D 9/065* (2013.01); *F01D 11/005* (2013.01); *F01D 25/12* (2013.01); *F05D 2260/607* (2013.01)

(58) Field of Classification Search
CPC .......... F01D 5/187; F01D 5/186; F01D 9/065; F05D 2260/607
See application file for complete search history.

(56) References Cited

U.S. PATENT DOCUMENTS

| | | | | |
|---|---|---|---|---|
| 3,362,681 A * | 1/1968 | Smuland | F01D 5/187 | 415/115 |
| 3,918,835 A * | 11/1975 | Yamarik | F01D 5/081 | 416/97 R |
| 4,178,129 A * | 12/1979 | Jenkinson | F01D 5/081 | 416/193 A |
| 4,192,138 A * | 3/1980 | Szema | F23R 3/045 | 431/351 |
| 10,941,664 B2 * | 3/2021 | Osgood | F04D 29/582 | |
| 11,008,872 B2 | 5/2021 | Perron et al. | | |
| 11,015,469 B2 * | 5/2021 | Saddawi | F01D 25/12 | |
| 11,073,024 B2 | 7/2021 | Perron et al. | | |
| 11,078,796 B2 * | 8/2021 | Perron | F01D 9/041 | |
| 2019/0292925 A1 * | 9/2019 | Saddawi | F01D 9/065 | |
| 2020/0190995 A1 * | 6/2020 | Perron | F01D 9/041 | |
| 2020/0300266 A1 * | 9/2020 | Osgood | F04D 29/582 | |

* cited by examiner

*Primary Examiner* — Eldon T Brockman
(74) *Attorney, Agent, or Firm* — Bachman & LaPointe, P.C.

(57) ABSTRACT

An inlet protector for a vane cooling air passage inlet including a vane including a vane cooling air inlet; an inlet protector fluidly coupled to the vane cooling air inlet, the inlet protector comprising a protector body having a discharge portion and a suction portion, an interior flow passage fluidly coupling the suction portion with the discharge portion; the discharge portion fluidly coupled with the vane cooling air inlet; and a suction inlet formed in the suction portion, wherein the suction inlet is located distally from the vane cooling air inlet.

15 Claims, 3 Drawing Sheets

INLET PROTECTOR FOR VANE COUPLING HOLE

BACKGROUND

The present disclosure is directed to an inlet protector for a vane cooling air passage inlet.

A cooling air passage for a vane is located radially outboard of a conformal seal. During operation particulate contaminants entrained in the cooling air stream can be carried proximate the air passage inlet of the vane. The particulate contaminants can be drawn into the cooling air passage inlet and contaminate the vane internal cooling air passages. Additionally, the conformal seal coating can become damaged from exposure to accumulating contaminants. The conformal seal coating can spall and degrade. The degraded coating can become entrained in the cooling air stream and become ingested into the cooling air passage inlet.

SUMMARY

In accordance with the present disclosure, there is provided an inlet protector for a vane cooling air passage inlet comprising a vane comprising a vane cooling air inlet; an inlet protector fluidly coupled to the vane cooling air inlet, the inlet protector comprising a protector body having a discharge portion and a suction portion, an interior flow passage fluidly coupling the suction portion with the discharge portion; the discharge portion fluidly coupled with the vane cooling air inlet; and a suction inlet formed in the suction portion, wherein the suction inlet is located distally from the vane cooling air inlet.

A further embodiment of any of the foregoing embodiments may additionally and/or alternatively include the interior flow passage fluidly communicates the suction inlet to a discharge exit formed in the discharge portion, the discharge exit being fluidly coupled with the vane cooling air inlet.

A further embodiment of any of the foregoing embodiments may additionally and/or alternatively include the suction inlet comprises a bell-mouth shape.

A further embodiment of any of the foregoing embodiments may additionally and/or alternatively include the suction inlet comprises a cross-sectional area 20 percent larger than the vane cooling air inlet.

A further embodiment of any of the foregoing embodiments may additionally and/or alternatively include the discharge exit comprises a cross sectional area equal to the vane cooling air inlet.

A further embodiment of any of the foregoing embodiments may additionally and/or alternatively include the inlet protector attaches to the vane along a vane face proximate the vane cooling air inlet.

A further embodiment of any of the foregoing embodiments may additionally and/or alternatively include the vane cooling air inlet comprises a second vane feed hole.

In accordance with the present disclosure, there is provided an inlet protector for a vane cooling air passage inlet comprising a gas turbine engine internal cavity; a vane proximate the internal cavity, the vane comprising a vane cooling air inlet; an anti-rotation lug proximate the vane cooling air inlet; a seal proximate the vane cooling air inlet; an inlet protector fluidly coupled to the vane cooling air inlet, the inlet protector comprising a protector body having a discharge portion and a suction portion, an interior flow passage fluidly coupling the suction portion with the discharge portion, the discharge portion fluidly coupled with the vane cooling air inlet; and a suction inlet formed in the suction portion, wherein the suction inlet is located within the internal cavity distally from the vane cooling air inlet.

A further embodiment of any of the foregoing embodiments may additionally and/or alternatively include the inlet protector for a vane cooling air passage inlet further comprising a vane-lug gap formed in the internal cavity between the anti-rotation lug and the vane cooling air inlet.

A further embodiment of any of the foregoing embodiments may additionally and/or alternatively include the suction inlet of the inlet protector extends radially outboard the seal and radially outboard the anti-rotation lug in the internal cavity.

A further embodiment of any of the foregoing embodiments may additionally and/or alternatively include the suction inlet comprises a bell-mouth shape formed from the suction inlet into the interior flow passage, the bell-mouth shape comprising a relatively larger cross-sectional area that gradually reduces along the interior flow passage to form a relatively low flow velocity region.

A further embodiment of any of the foregoing embodiments may additionally and/or alternatively include the inlet protector attaches to the vane along a vane face proximate the vane cooling air inlet.

A further embodiment of any of the foregoing embodiments may additionally and/or alternatively include the interior flow passage fluidly communicates the suction inlet to a discharge exit formed in the discharge portion, the discharge exit being fluidly coupled with the vane cooling air inlet.

In accordance with the present disclosure, there is provided a process for preventing debris with an inlet protector for a vane cooling air passage inlet comprising a vane comprising a vane cooling air inlet; fluidly coupling an inlet protector to the vane cooling air inlet, the inlet protector comprising a protector body having a discharge portion and a suction portion, an interior flow passage fluidly coupling the suction portion with the discharge portion; and fluidly coupling the discharge portion with the vane cooling air inlet.

A further embodiment of any of the foregoing embodiments may additionally and/or alternatively include the process further comprising forming a suction inlet in the suction portion, wherein the suction inlet is located distally from the vane cooling air inlet.

A further embodiment of any of the foregoing embodiments may additionally and/or alternatively include the process further comprising fluidly communicating the interior flow passage between the suction inlet and a discharge exit formed in the discharge portion; and fluidly coupling the discharge exit with the vane cooling air inlet.

A further embodiment of any of the foregoing embodiments may additionally and/or alternatively include the process further comprising forming a bell-mouth shape from the suction inlet into the interior flow passage, the bell-mouth shape comprising a relatively larger cross-sectional area that gradually reduces along the interior flow passage; and forming a relatively low flow velocity region proximate the suction inlet.

A further embodiment of any of the foregoing embodiments may additionally and/or alternatively include the process further comprising extending the suction inlet of the inlet protector radially outboard a seal and radially outboard an anti-rotation lug in an internal cavity proximate the vane.

A further embodiment of any of the foregoing embodiments may additionally and/or alternatively include the process further comprising attaching the inlet protector to the vane along a vane face proximate the vane cooling air inlet.

A further embodiment of any of the foregoing embodiments may additionally and/or alternatively include the process further comprising forming the suction inlet with a cross-sectional area 20 percent larger than the vane cooling air inlet.

Other details of the inlet protector for a vane cooling air passage inlet are set forth in the following detailed description and the accompanying drawings wherein like reference numerals depict like elements.

DETAILED DESCRIPTION

Figure 1:
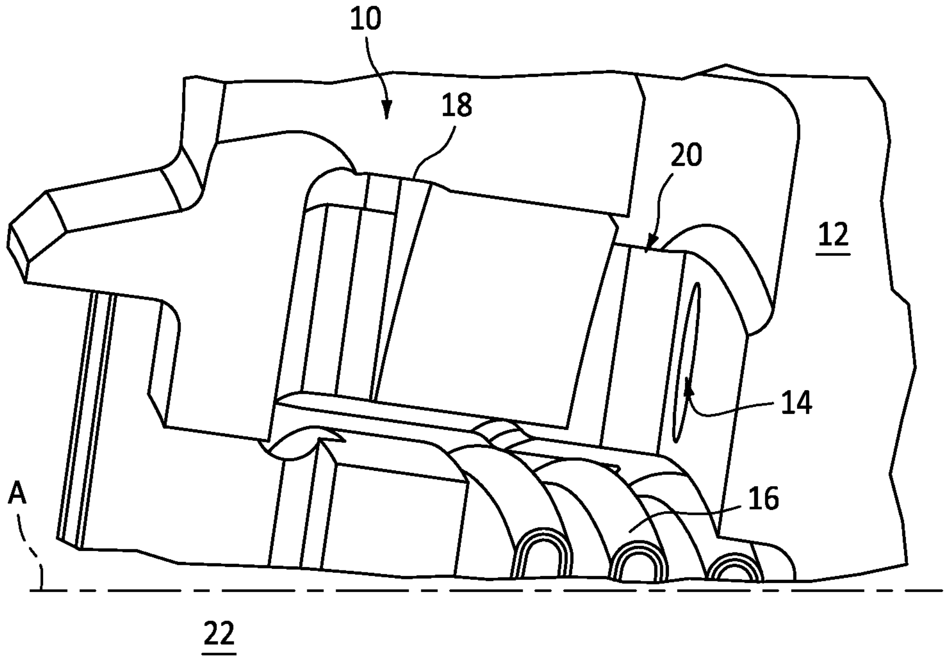
FIG. 1 is an isometric view schematic representation of an exemplary internal cavity proximate a vane cooling air inlet.
Figure 2:
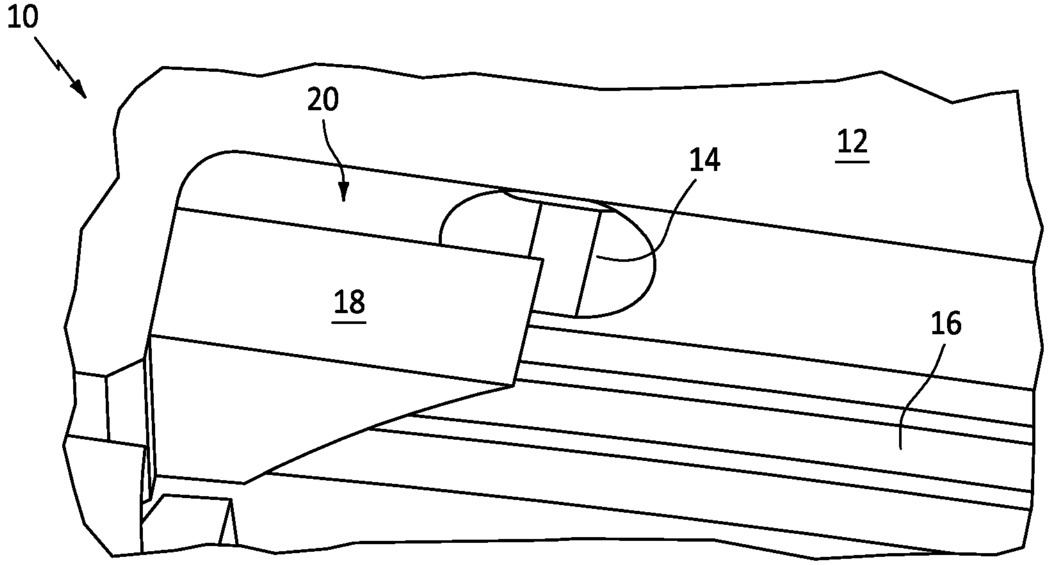
FIG. 2 is an isometric view schematic representation of an exemplary internal cavity proximate a vane cooling air inlet.
Figure 3:
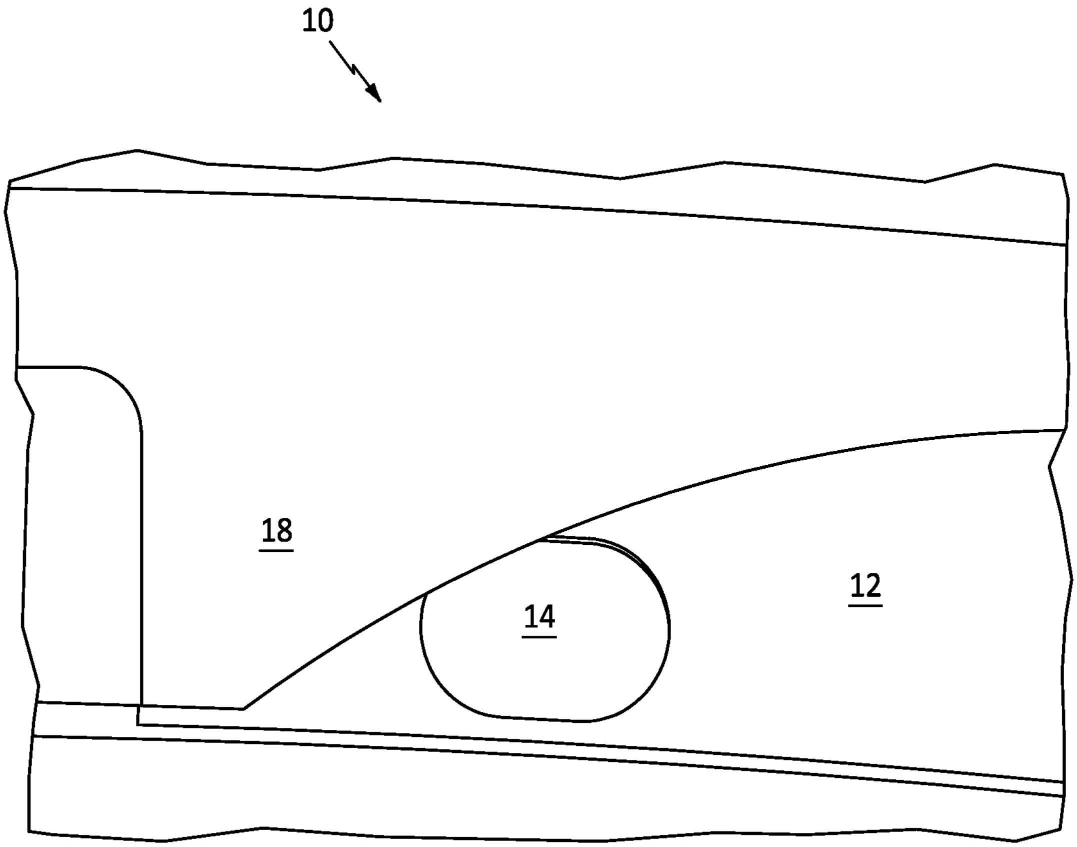
FIG. 3 is a side view schematic representation of an exemplary internal cavity proximate a vane cooling air inlet.

Referring now to FIG. 1, FIG. 2 and FIG. 3, there is illustrated an exemplary internal cavity 10 proximate a vane 12 cooling air inlet 14. In an exemplary embodiment, the vane cooling air inlet 14 can be the second vane feed hole. The internal cavity 10 includes a conformal or (W-seal) 16 proximate the vane cooling air inlet 14. The internal cavity 10 includes an anti-rotation lug 18 proximate the vane cooling air inlet 14. A vane-lug gap 20 is formed in the internal cavity 10 between the anti-rotation lug 18 and the vane cooling air inlet 14. The vane-lug gap 20 can be sized to approximately 0.09 inch in the axial direction relative to the axis A of the gas turbine engine 22 associated with the vane 12.

Figure 4:
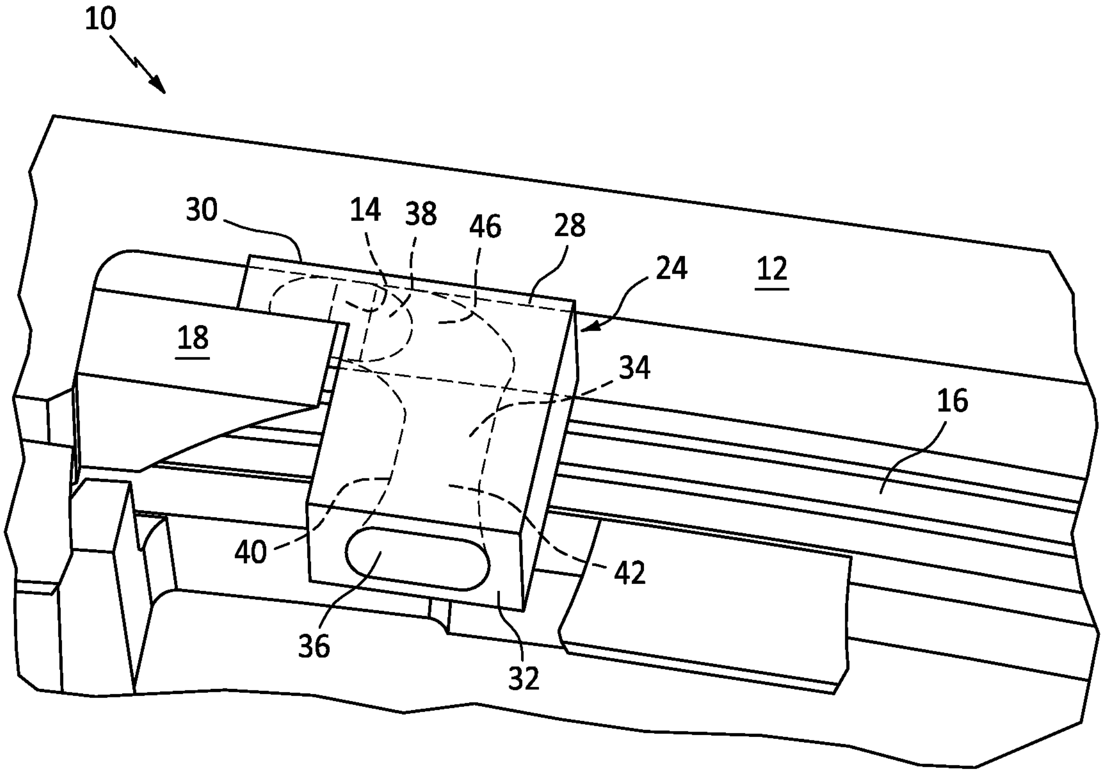
FIG. 4 is an isometric view schematic representation of an exemplary inlet protector.
Figure 5:
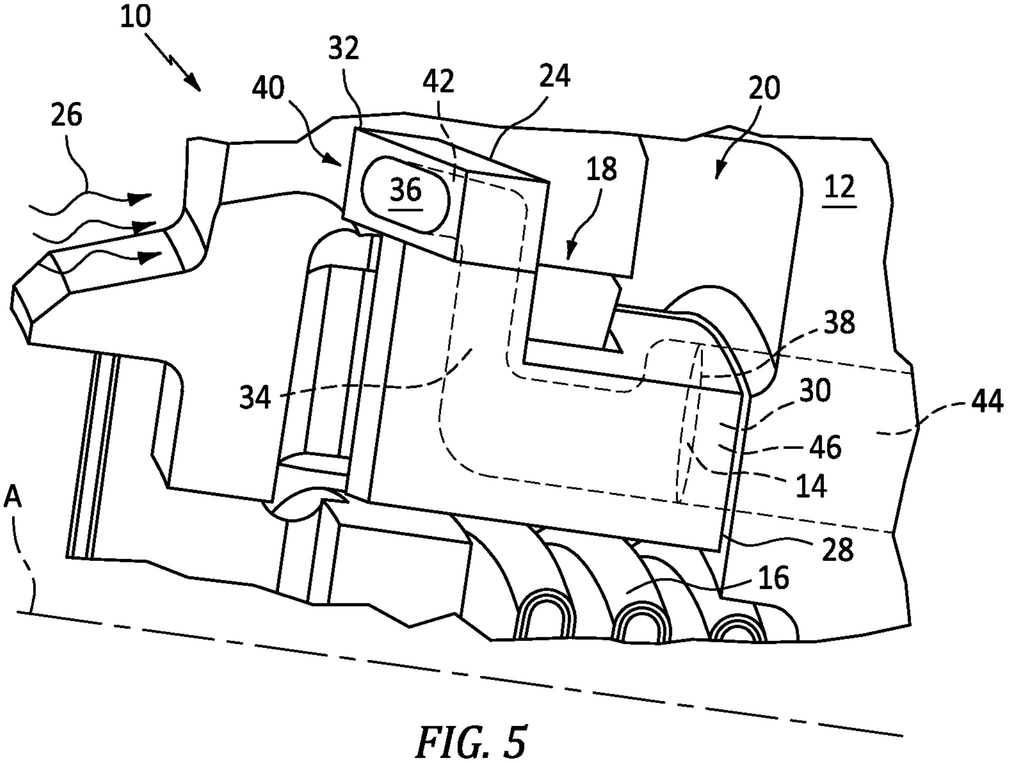
FIG. 5 is an isometric view schematic representation of an exemplary inlet protector.

Referring also to FIG. 4 and FIG. 5 an exemplary inlet protector 24 is shown. The inlet protector 24 is configured to receive cooling air 26 located in the internal cavity 10 distal from the vane cooling air inlet 14 and direct the cooling air 26 to the vane cooling air inlet 14.

The inlet protector 24 includes a protector body 28. The protector body 28 includes a discharge portion 30 located proximate the vane cooling air inlet 14 and a suction portion 32 located distal from the vane cooling air inlet 14. In an exemplary embodiment, the suction portion 32 extends into the internal cavity 10 upstream from the W-seal 16 relative to the cooling air 26 flow direction. In an exemplary embodiment, the suction portion 32 extends into the internal cavity 10 distally apart from the W-seal 16 such that the cooling air 26 that is utilized does not impart turbulent flow characteristics over the conformal seal 16. The inlet protector 24 can extend radially outboard the conformal seal 16 and radially outboard the anti-rotation lug 18, such that the suction portion 32 can receive cooling air 26 that has less debris than the cooling air 26 proximate the conformal seal 16.

The protector body 28 includes an interior flow passage 34 that fluidly communicates from a suction inlet 36 to a discharge exit 38. The interior flow passage 34 is formed within the protector body 28.

The suction inlet 36 forms a bell-mouth shape 40 from the suction inlet 36 into the interior flow passage 34. The bell-mouth shape 40 has a relatively larger cross-sectional area that gradually reduces along the interior flow passage 34 to create a relatively low flow velocity region 42. The bell-mouth shape 40 decreases an inlet velocity of the cooling air 26 which results in less debris being ingested into the inlet protector 24 and ultimately into the vane cooling passages 44. In an exemplary embodiment, the suction inlet 36 has a cross-sectional area about 20 percent larger than the vane cooling air inlet 14.

The discharge exit 38 of the interior flow passage 34 is sized to directly fluidly couple to the vane cooling air inlet 14. An exemplary embodiment, the discharge exit 38 has the same cross sectional area as the vane cooling air inlet 14. In an exemplary embodiment, the vane cooling air inlet 14 can be oversized, that is modified to be more accessible and have a cross-sectional area to accommodate a larger flow area as well as fluidly couple with the inlet protector 24.

The inlet protector 24 is attached to the vane 12 along the vane face 46 proximate the vane cooling air inlet 14. In an exemplary embodiment the inlet protector 24 can be brazed to the vane face 46. The inlet protector 24 can be constructed from materials compatible with the vane 12 and the environmental conditions within the internal cavity 10.

The inlet protector 24 can be installed separate and apart from the anti-rotation lug 18. In an exemplary embodiment, the inlet protector 24 can be separated from the anti-rotation lug 18 by a distance of from about 20 to about 50 thousandths of an inch.

A technical advantage of the disclosed inlet protector includes the reduction of debris flowing into the vane cooling air inlet.

Another technical advantage of the disclosed inlet protector includes locating a suction inlet in the internal cavity away from locations with debris accumulation.

Another technical advantage of the disclosed inlet protector includes a suction inlet with a bell-mouth shape for reduction of inlet velocity to minimize debris ingestion.

Another technical advantage of the disclosed inlet protector includes a modification to the vane cooling air inlet to accommodate the flow of cooling air into the vane cooling passages.

Another technical advantage of the disclosed inlet protector includes a reduction in turbulent flow adjacent to the conformal seal.

There has been provided an inlet protector for a vane cooling air passage inlet. While the inlet protector for a vane cooling air passage inlet has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. An inlet protector for a vane cooling air passage inlet comprising:

a vane comprising a vane cooling air inlet;

an inlet protector fluidly coupled to the vane cooling air inlet, the inlet protector comprising a protector body having a discharge portion and a suction portion, an interior flow passage fluidly coupling the suction portion with the discharge portion;

the discharge portion fluidly coupled with the vane cooling air inlet; and a suction inlet formed in the suction portion, wherein the suction inlet is located distally from the vane cooling air inlet;

a seal proximate the vane cooling air inlet;

an anti-rotation lug proximate the vane cooling air inlet; wherein the suction inlet of the inlet protector extends radially outboard the seal and radially outboard the anti-rotation lug in the internal cavity.

2. The inlet protector for a vane cooling air passage inlet according to claim 1, wherein the interior flow passage fluidly communicates the suction inlet to a discharge exit formed in the discharge portion, the discharge exit being fluidly coupled with the vane cooling air inlet.

3. The inlet protector for a vane cooling air passage inlet according to claim 1, wherein the suction inlet comprises a bell-mouth shape.

4. The inlet protector for a vane cooling air passage inlet according to claim 1, wherein the suction inlet comprises a cross-sectional area 20 percent larger than the vane cooling air inlet.

5. The inlet protector for a vane cooling air passage inlet according to claim 1, wherein the discharge exit comprises a cross sectional area equal to the vane cooling air inlet.

6. The inlet protector for a vane cooling air passage inlet according to claim 1, wherein the inlet protector attaches to the vane along a vane face proximate the vane cooling air inlet.

7. The inlet protector for a vane cooling air passage inlet according to claim 1, wherein the vane cooling air inlet comprises a second vane feed hole.

8. An inlet protector for a vane cooling air passage inlet comprising:

a gas turbine engine internal cavity;

a vane proximate the internal cavity, the vane comprising a vane cooling air inlet;

an anti-rotation lug proximate the vane cooling air inlet;

a seal proximate the vane cooling air inlet;

an inlet protector fluidly coupled to the vane cooling air inlet, the inlet protector comprising a protector body having a discharge portion and a suction portion, an interior flow passage fluidly coupling the suction portion with the discharge portion, the discharge portion fluidly coupled with the vane cooling air inlet; and a suction inlet formed in the suction portion, wherein the suction inlet is located within the internal cavity distally from the vane cooling air inlet; wherein the suction inlet of the inlet protector extends radially outboard the seal and radially outboard the anti-rotation lug in the internal cavity.

9. The inlet protector for a vane cooling air passage inlet according to claim 8, further comprising:

a vane-lug gap formed in the internal cavity between the anti-rotation lug and the vane cooling air inlet.

10. The inlet protector for a vane cooling air passage inlet according to claim 8, wherein the suction inlet comprises a bell-mouth shape formed from the suction inlet into the interior flow passage, the bell-mouth shape comprising a relatively larger cross-sectional area that gradually reduces along the interior flow passage to form a relatively low flow velocity region.

11. The inlet protector for a vane cooling air passage inlet according to claim 8, wherein the inlet protector attaches to the vane along a vane face proximate the vane cooling air inlet.

12. The inlet protector for a vane cooling air passage inlet according to claim 8, wherein the interior flow passage fluidly communicates the suction inlet to a discharge exit formed in the discharge portion, the discharge exit being fluidly coupled with the vane cooling air inlet.

13. A process for preventing debris with an inlet protector for a vane cooling air passage inlet comprising:

a vane comprising a vane cooling air inlet;

fluidly coupling an inlet protector to the vane cooling air inlet, the inlet protector comprising a protector body having a discharge portion and a suction portion, an interior flow passage fluidly coupling the suction portion with the discharge portion; and fluidly coupling the discharge portion with the vane cooling air inlet;

forming a suction inlet in the suction portion, wherein the suction inlet is located distally from the vane cooling air inlet;

fluidly communicating the interior flow passage between the suction inlet and a discharge exit formed in the discharge portion;

fluidly coupling the discharge exit with the vane cooling air inlet;

forming a bell-mouth shape from the suction inlet into the interior flow passage, the bell-mouth shape comprising a relatively larger cross-sectional area that gradually reduces along the interior flow passage;

forming a relatively low flow velocity region proximate the suction inlet; and extending the suction inlet of the inlet protector radially outboard a seal and radially outboard an anti-rotation lug in an internal cavity proximate the vane.

14. The process of claim 13, further comprising:

attaching the inlet protector to the vane along a vane face proximate the vane cooling air inlet.

15. The process of claim 14, further comprising:

forming the suction inlet with a cross-sectional area 20 percent larger than the vane cooling air inlet.

* * * * *